Patented Aug. 3, 1937

2,088,684

UNITED STATES PATENT OFFICE 2,088,684

PROCESSES FOR TREATING THE SECRETIONS OF PLANTS

Umberto Gualtiero Bellini Delle Stelle, Saint-Seurin, Bordeaux, France

No Drawing. Application January 7, 1932, Serial No. 585,388. Renewed December 15, 1936. In France January 9, 1931

4 Claims. (Cl. 260—99)

The present invention relates to the treatment of juices, resins, secretions, elaboration products of plants, such as the crude turpentine of pinetrees, balsams, latexes, etc.

Products of this kind, in the crude state in which they are collected sometimes have a very restricted use, but most of them do not have any actual commercial value. It is therefore almost always necessary to transform them by suitable treatments or to extract from them derivatives which have a commercial value. However, such treatments have only been applied hitherto to crude products after they have been subjected to more or less considerable and costly preparatory treatments.

Thus, as regards the resin or crude turpentine of pinetrees, the preparatory treatments were to enable it to be first of all extracted by fusion from the collecting receptacles in which it existed in the form of a viscous coloured paste turbid with hard and adherent deposits; it was then necessary to carry out terebinthinating operations such as fusion, purification, separation of the water and decantation. A product called turpentine was thus obtained. The turpentine was distilled to separate: the essence of turpentine including essential oils such as pinene, nopinene and any other terpenic volatile essences which constituted its nascent solution; limonene, alcohols such as resinol and resinotol and certain resinic ethers and aromatic acids, terebinthinic acids which were transformed into colophane, including resinic or abietic acids, the oxidation products and the ethers thereof.

Essence of turpentine and colophane already have a certain commercial value, but it is often desirable to use such products to obtain derivatives therefrom having a greater value, on the one hand such as the aforesaid essential oils, terpineol, borneol, from which synthetic camphor is extracted, dipentene, sylvestrene, carene, resinic ethers and terpinic aldehydes and, on the other hand, such as soap, resin black, Chinese ink, glue, polishes, resinic ethers, lakes, plastic substances, etc. Now, as far as the inventor knows, the above derivatives have only hitherto been prepared from essence of turpentine and colophane respectively, either by isolating certain of their components, or by transforming them chemically. In respect of these derivatives the aforesaid distilling operation can therefore be considered as one of the phases of the preparatory treatment.

The accepted use of said preparatory treatments was founded on the general conviction of the impossibility of treating directly by transformation processes the crude products which have not been subjected to preparatory treatment.

The inventor has discovered that the reason for the unsuitability of the crude products being directly subjected to the operations for transformation into derivatives, and of the acknowledged necessity of having recourse to the preparatory treatment, resides in the fact that the products collected and delivered hitherto to the industry are constituted by impure secretions which are substantially changed and do not contain all the elements of the juices. As regards coniferae, for example, the crude turpentine in running out of the incision and remaining in the collecting receptacles, oxidizes and passes through a series of alterations. Volatile essences evaporate, certain constituents disappear, while others, such as the rosin or the galipot or the terebinthinic acids oxidize and crystallize so that the collected product is a pasty or even solid product very different from the product of the crude turpentine in the so-called "ephemeral" state in which it exists at the moment of its formation. On the other hand, if a crude product constituted by a secretion which is unchanged since its formation is taken, such for example as the "ephemeral" or "natural" turpentine which can be collected by means of certain processes, it becomes possible to avoid the aforesaid preparatory treatments and to treat it chemically for transforming it into derivative products having a commercial value. Said process constitutes the main feature of the invention.

By chemical treatment must be understood herein any treatment belonging to the chemical industry even although it does not give rise to a chemical reaction, but simply consists in a physical action, such as dilution, dissolution, distillation, separation or precipitation or any physicochemical or catalytic action, etc. On the other hand the word "unchanged" must not be taken in its absolute sense: the possibility or the impossibility of obtaining satisfactory results by the process of the invention offer a sufficient criterion for distinguishing the unchanged product from the changed product. The treatment to which the crude products are subjected or the substance which is made to act on said products obviously depends on the derivatives it is desired to obtain. Such treatment may be known per se, as is the case of the usual distillation by means of which essence of turpentine and colophane were obtained from ordinary industrial turpentine which was itself obtained by preparatory treatment of the crude turpentine collected. According to the invention, the distillation can be carried out directly, without necessitating additional operations. In other cases, certain special treatments will be used which will be specified hereinafter.

The process according to the invention can be carried out, in certain cases, by placing the secretion as it runs out of the incision, in the presence of substances known as "receiving" substances serving for the chemical treatment, by introducing said substances into the collecting receptacles receiving the secretion. By thus treating the crude products on the spot, when they are still in the collecting receptacles, numerous advantages are obtained in addition to those resulting from the elimination of the preparatory treatments. Advantage is taken in particular of the relatively long time a receptacle takes to fill and during which the secretion falls periodically drop by drop burying itself in the receiving substance; the reactions can therefore go on without any loss of time, whereas otherwise they would necessitate immobilizing the products treated at the factory during a corresponding period.

On the other hand, the crude products collected such as the aforementioned natural turpentine obtained by working the incisions of plants under certain conditions of protection against atmospheric or other agents, can be treated in accordance with the invention, that is to say without having recourse to preparatory treatments, and in particular by avoiding the evaporation or the re-absorption of the volatile components of the secretions by the tissues of the tree and their change by fermentation and oxidation. These products remain sufficiently unchanged to give satisfactory results when they are treated directly for transforming them into products of value, even after a certain sojourn in the collecting receptacles and after their manipulation or their transport into a factory.

Such products can be obtained, in particular, in connection with the exploitation of resinous trees, by carrying out the processes which the inventor recently proposed and more especially the processes which are the object of his applications for French patents of July 11th, 1931 and November 18th, 1931. Said processes produce crude products which were hitherto unknown in the industry and have characteristics which distinguish them completely from an industrial aspect, as well as from the aspect of their composition, from the known crude products. It has just been stated that said products can be treated directly according to the invention, whereas the crude products known cannot be so treated. As regards their composition, in addition to the fact that they have unchanged secretions, contrary to those of the known products, they contain a notable proportion of volatile essences; in particular the aforesaid natural turpentine contains, apart from a high proportion of essence of turpentine (more than 33%) a substantial proportion of terpene, volatile substances or ethers, which can neither be collected nor evaluated in the crude turpentine currently obtained.

However, in order to make said unchanged crude products more suitable for the direct treatment according to the invention, it may be useful to subject them, during their extraction, to preservative or improving treatments. In accordance with the invention, the secretion can, for example, be placed in the presence of anti-diastasic substances, of protecting substances forming a superficial layer, preventing evaporation, or furthermore it may be subjected as soon as it runs out of the plant to the action of suitably filtered actinic, thermal or luminous rays. The latter process can be carried out by providing, for example, the apparatus protecting the incision, with suitably constituted transparent colored walls or covers. The inventor has discovered in particular, that when an incision of a conifera is subjected to light rays filtered through a greenish-yellow filter, the unchanged product collected, called in this case "natural turpentine" is much richer in essential oils (pinene, nopinene, limonene, sylvestrene, terpenic carbide), in alcohols (resinol, resinotol), in resinic ethers and in aromatic acids (benzoic and cinnamic ethers and their acids) and more particularly the reproduction of the resinic cells takes place more rapidly and more abundantly, whereby a more intensive working is possible.

According to another feature of the invention, a product extracted from the crude product or a derivative of the latter product is preferably used as a receiving substance introduced into the collecting receptacles or as a substance serving for the subsequent treatment of the crude product, thereby avoiding costly recuperation treatments or losses of said substance. For example, in the case of turpentine, the receiving substance can, in certain cases, contain essence of turpentine.

A number of examples of the process according to the invention will be given hereinafter.

*Example I.*—A quantity of essence of turpentine which may contain 10% of the contents of the receptacle is introduced into the collecting receptacle before the tapping operation. This maximum quantity is sufficient for the turpentine to remain in the liquid state at all temperatures. The liquid collected is actually turpentine which does not contain any water or impurities, but which is capable, in certain cases, of giving a precipitate of terebinthinic acids at the bottom of the receptacle. When the turpentine has finished running out or the receptacle is full, either the liquid portion alone is withdrawn by decantation, or the liquid portion and the precipitate. These products are subsequently treated either separately or together, by simple distillation for extracting the essence of turpentine and the colophane therefrom.

If only the liquid portion is withdrawn the receptacle containing the precipitate can be used again for one or more other tapping operations, until the quantity of precipitate is sufficiently large. At that time, after having withdrawn all the liquid portion which floats above the precipitate, the precipitate is withdrawn or treated in the receptacle itself with an alkaline solution or a solvent for forming a terebinthinate. The solution may be constituted by sodium carbonate, potassium carbonate and even sodium nitrate. The terebinthinate thus obtained, which contains a proportion of essence of 7 to 10% is sufficiently pure to be used directly as polishes or coatings or for being directly treated, for example, for the manufacture of soap, varnishes or ethers, as a substitute for the resinates used in these industries and obtained by the treatment of colophane.

The process according to this example enables a liquid turpentine which does not contain any water or impurity to be obtained in the collecting receptacle. Said process therefore permits the usual terebinthinating operations to be dispensed with (namely: fusions, purification of the turpentine, separation of the water and decantation) which it was necessary to carry out in the present state of the art before distilling the turpentine, for obtaining essence of turpentine and colophane.

In this example, essence of turpentine has been chosen as a diluting medium because said essence is one of the constituents of the product collected and can consequently be completely recuperated. It is of course obvious that any other diluting mediums or solvents could be used, but such substances usually entail additional operations for their recuperation.

It has been found that it was advantageous to incorporate to the diluting medium, which is previously added in the receptacle, (for example to the essence of turpentine) an infinitesimal quantity of an antidiastatic substance capable of forming a thin fatty film and consequently impermeable to volatile essences on the surface of the product and on the walls of the collecting receptacle. Said substance may be aniline which is added in a proportion of 1 for 10,000 of essence of turpentine, exalgin and even terpineol or other vegetable or animal oils in suitable proportions.

*Example II.*—An alkaline solution, for example, a solution of caustic soda which may attain 8%, or ammonia at a concentration not exceeding 5 to 1,000 is introduced into the collecting receptacle. The turpentine which falls into the receptacle is transformed on contact with the alkaline solution into a viscous liquid consisting of a resinate or soap containing the volatile elements of the turpentine in suspension. This product which is free from impurities and does not contain any water, except the solution water added, can be used directly in any resin industry with the advantage that instead of subjecting it to the usual distillating operations for obtaining essence of turpentine and colophane, it can be treated directly in the various industries (for example the soap, the varnish industries, etc.). In this treatment, at the same time as the desired industrial product (soap, varnish, etc.) is obtained, it is possible to extract the essence of turpentine contained in the product without carrying out any previous or additional heating operation. By means of said process, none of the constituents of the secretion are lost.

*Example III.*—A kilogram of natural liquid turpentine (which runs out at the first incision of the tree, an efflux known as "physiological", and obtained under shelter from the air) is mixed with one to two kilograms of essence of turpentine ($C_{10}H_{16}$) to which has been previously added a proportion of 0.5 to 1 for 10,000 of aniline ($C_6H_5NH_2$). Up to 1% of terpineol ($C_{10}H_{18}O$) is added to the mixture of liquid turpentine, essence of turpentine and aniline.

It is sufficient to introduce 8 to 10 grams of this liquid into a collecting receptacle intended for collecting from 800 cubic centimeters to one liter of turpentine.

During the efflux, the turpentine which falls drop by drop into the collecting receptacle mixes with the "receiving" substance. A layer of essence of turpentine and of terpineol contained in said substance floats above said mixture and the turpentine remains in the liquid state. Furthermore, any oxidizing or diastasic action which might occur in the turpentine is prevented by the small quantity of aniline and terpineol which is present in the collecting receptacle in a distinctly separate layer.

*Example IV.*—One litre of essence of turpentine ($C_{10}H_{16}$) is mixed with ¼ of a litre of liquid ammonia ($NH_3$) and 100th of a litre of terpineol ($C_{10}H_{18}O$). This mixture is mixed with three litres of liquid turpentine obtained by physiological efflux.

It is sufficient to introduce about 1 to 5 centigrams of this liquid into each collecting receptacle intended for collecting from 800 cubic centimeters to one litre of turpentine.

Owing to the essence of turpentine contained in said liquid, the turpentine which falls drop by drop into the collecting receptacle, when it is collected, remains liquid. Furthermore, the terpineol has an anti-oxidizing or antidiastasic action on the turpentine, which contributes to maintain it in a pure and unchanged state. As regards the ammonia, its action is two-fold. On the one hand it has an antioxidizing action on the turpentine which falls into the receptacle and, on the other hand, as the turpentine falls, ammonia gas is liberated. This gas tends to be liberated at every moment, but the inventor has noticed that such liberation is caused by the gradual introduction of the turpentine during the collection.

Said gas spreads into the upper portion of the collecting receptacle and when the collection is carried out sheltered from the air and the incision is in direct communication with the collecting receptacle, it reaches the incision, so that the turpentine is in contact with said gas from the beginning of its efflux and during its passage from the incision to the collecting receptacle. Said contact therefore increases the antioxidizing and antidiastasic action exerted by the ammonia, thereby permitting an absolutely pure turpentine to be collected and in a more abundant quantity.

*Example V.*—Hydrochloric acid for example or preferably diluted sulphuric acid, of a concentration between 20 to 40°, for example 33° Beaumé, is introduced into the collecting receptacle as a receiving substance. The sulphuric acid produces a hydration of the pinene and of the nopinene contained in the turpentine, and a precipitate of terpine or its derivatives is formed. It is preferable to introduce a sufficient quantity of acid for treating several successive effluxes of turpentine produced by the reviving of the incision or by the formation of a new incision. Each efflux being set up, after a period of days of rest which is always equal, produces 30 to 50 grams of turpentine, which falls at the rate of 3 to 6 drops per minute. It is therefore advisable to add about 10 grams of dilute sulphuric acid which is sufficient for treating several hundred grams of natural turpentine.

Instead of introducing dilute sulphuric acid in the collecting receptacle, concentrated sulphuric acid can be introduced in the same proportion by weight, which gives a by-product of terpineol, and even crude terpineol.

*Example VI.*—About 10 grams of a "receiving" substance is introduced into the collecting receptacle, said substance being constituted by: 1 kilogram of acetic acid, 100 cubic centimeters of benzene sulfonic acid and if necessary, 100 cubic centimeters of acetic anhydride, which may produce a catalytic effect.

With this substance terpineol or one of its esters is obtained.

*Example VII.*—About 15 grams of acetic acid and a small quantity of mineral acid or of zinc chloride is introduced into the collecting receptacle, or about 15 grams of oxalic acid and a small quantity of benzene sulfonic acid is introduced into the collecting receptacle. In the collecting receptacle, after the latter has remained in place for a long time before being completely filled with the turpentine, it is noticed that the liquid which forms the upper layer, contains much more camphene and limonene than the normal essence. The abietic acids are dissolved in the receiving substance, and a mixture of bornyl and fenchyl acetate is obtained in small quantity, and acetate of terpineol. By using the mixture of oxalic acid and benzene sulfonic acid, a greater precipitation of bornyl is obtained.

As the drops of turpentine run out into the collecting receptacle and bury themselves in the receiving substance prepared according to the last three examples, the abietic acids dissolve in the receiving substance, and a certain catalytic action takes place at the same time as a hydration of the constituents of the essence of turpentine (pinene and nopinene) which may give terpine, terpineol or other derivatives. When the concentration of the elements of the receiving substance is sufficiently high, a transformation of the constituents of the essence of turpentine into bornyl, bornyl ester or other derivatives takes place.

When the collecting receptacle gradually fills with turpentine, three layers are observed constituted in the following manner:

1. An upper liquid residual layer, which represents what is called in the industry terpinolene.
2. A liquid layer beneath the first layer, constituted by the receiving substance.
3. A lower layer usually constituted by a crystalline deposit of terpene, crude terpineol, etc.

Possibly, between the two last layers there might be a very thin layer of terebinthinic acid which is a saturated solution in the lowest part of the layer of receiving substance.

When the collecting receptacle is full, the various layers can be easily separated by decantation at the actual moment when it is collected or, for example, by removing the liquid portion and allowing the crystalline precipitates to accumulate at the bottom of the receptacle which will be removed at the end of the seasonal operations. The liquid thus withdrawn from the collecting receptacle is a mixture of turpentine, terebinthinic acid and of receiving substance, which elements when placed in a barrel are easily separated by decantation owing to their difference of density.

The "receiving" substance and the terebinthinic acids in solution which are at the bottom of the barrel are removed from the bottom of the barrel, whereas the residual turpentine can be distilled in order to obtain essence of turpentine and colophane.

By allowing the "receiving" substance to rest, a precipitate of terebinthinic acids is obtained which is collected and distilled to obtain colophane and a little essence of turpentine where it is used directly in the industry for soap making, varnishes, the manufacture of glue, terebinthinic ethers, terebinthinates, siccatives, etc. The terebinthinic acids can also be directly used for the manufacture of plastic substances. For this purpose a mixture of ⅔ of terebinthinic acid and ⅓ of formaldehyde at 40% is taken; to this mixture is added 20% of its weight of ordinary phenol and the whole mixture is condensed after heating. The substance thus obtained is transparent and unbreakable. At the same time as this operation is carried out, the heat caused by the heating can be used for recuperating by distillation the essence of turpentine which the terebinthinic acids contain. Of course, the receptacles which are intended to be in contact with the sulphuric acid must be resistant to said acid. They can, for example, be provided with a lead lining.

A plastic substance can be obtained by treating the natural turpentine directly after the collection or in the state in which it runs out into the collecting receptacles, with ammonia or lactic acid or glycerine. A gelatine is thus obtained from which a clear liquid separates out which is constituted almost entirely by essence of turpentine. The liquid is removed and the gelatine treated with phenol or acetone as above.

The advantage of the process according to the invention, based on the action of substances on the crude liquid turpentine such as it runs out of the incision, resides in the following facts:

1. Advantage is taken of the time which the turpentine takes to run into the collecting receptacle after the reviving of an old incision or after a new incision is made. For example, a receptacle of 1 litre fills in 2 or 3 months. During this time, the turpentine runs drop by drop and buries itself in the receptacle containing the receiving substance. The latter therefore has all the time necessary for exerting its action on the drops of turpentine. Furthermore, said action takes place during the interval of time which the turpentine takes to run out of the incision between two revivals, each interval is normally not used, and this therefore represents an economy of time.

2. Owing to the fact that the turpentine runs drop by drop into the receiving substance and buries itself therein, it is possible to use a very small quantity of said substance, since the drops of turpentine stop in the said substance during a sufficient time to give the receiving substance time to act on the essence contained in the turpentine.

3. The apparatus used is of the most simple kind and the manipulation is reduced to a minimum.

4. The value of the products collected in the collecting receptacle is enhanced in considerable proportions; since, instead of collecting a crude turpentine which, on contact with the air crystallizes to form a whitish substance when the collection is carried out in open pots, as has been done hitherto, not only a turpentine such as is formed at the time of its efflux and which is liquid is obtained, but also the derivatives which are extracted from the essence of turpentine and the products which were hitherto derived from colophane and which are obtained by means of the invention, by the direct treatment of the terebinthinic acids in the cold state and, if desired at the actual time they are collected.

All the preceding examples relate to the extraction and the treatment of the secretions of coniferae.

*Example VIII.*—An incision is made in the bast of a lactiferous tree (for example the *Hevea brasiliensis*) and the apparatus for the tapping is installed. A solution of formic or acetic acid or ammonia, the concentration of which can vary between 4 and 10% is added in the collecting receptacle. The latex which is an emulsion of rubber and a liquid called serum separates out at the contact of the said solution to form a layer of coagulated and soft rubber which floats on the serum. It is obvious that by this process a pure product is obtained, which in the present state of the art was only obtained hitherto after a relatively complicated treatment of the latex, such as was secreted by the tree, which necessitated the transport of all the serum to the factory, thereby entailing very considerable increase in the weight to be transported (70%).

It is of course understood that the process according to the invention has only been described in a purely explanatory but nonlimitative manner, and that it is possible to make any modifications of detail therein without altering its spirit. For example, instead of adding the substance first in the receptacle, said substance can be gradually introduced by an automatic means as the secretion runs out, or even added in the collecting receptacle after the efflux.

What I claim is:

1. The method of treating the secretions of resiniferous trees, which consists in subjecting the resinous secretion to the action of an acidic medium including benzene-sulfonic acid.

2. The method of treating the secretions of resiniferous trees, which consists in subjecting the resinous secretion to the action of an acidic medium including benzene-sulfonic acid and acetic acid.

3. The method of treating the secretions of resiniferous trees, which consists in subjecting the resinous secretion to the action of an acidic medium including acetic acid and anhydride.

4. The method of treating the secretions of resiniferous plants, which consists in exposing the secretions to a mixture of acetic acid, benzene-sulfonic acid and acetic anhydride, thereafter permitting the mixture to settle, and in separating the products obtained by decantation.

UMBERTO GUALTIERO BELLINI
DELLE STELLE.